Patented Jan. 25, 1927.

1,615,673

UNITED STATES PATENT OFFICE.

STANLEY J. BEEBE, OF ENDICOTT, NEW YORK, ASSIGNOR TO ENDICOTT-JOHNSON CORPORATION, OF ENDICOTT, NEW YORK, A CORPORATION OF NEW YORK.

BASE FOR PAINTS.

No Drawing. Application filed May 31, 1924. Serial No. 717,126.

This invention relates to paints and the principal object thereof is to provide a new and useful base to be used in the manufacture of paints and the like; which base is made out of scrap leather by the method as hereinafter described.

I will explain the invention to enable others to adopt and use the same, and refer to the claims for summaries thereof.

I have discovered that a good and inexpensive base for paints can be made from scrap leather by first grinding the leather very fine and then drying the ground product in ovens at a temperature sufficient to evaporate the moisture without carbonizing the ground leather.

No particular kind of leather is essential, and all kinds of scrap leather may be used. The scrap leather is preferably ground while in a dry condition, but any oil contained in the leather can be left therein.

The scrap leather is preferably reduced or ground sufficiently fine to pass through a screen having a mesh of from 150 to 200 to the inch, as such reduction gives satisfactory results. Obviously the mesh of the screen employed may be varied within the scope of the invention to obtain a desired quality of the base.

Such ground scrap leather is then dried in any suitable way at a temperature of approximately 250° to 300° Fahrenheit. The temperature may be varied according to the condition of the ground scrap, but should not be such as would carbonize the ground leather, or cause undesirable chemical changes to take place in the ground leather particles. Preferably I dry the ground scrap in revolving ovens.

In making paint, good results may be obtained by mixing 5 pounds of the novel ground leather base with the grinding japan, or other grinding preparation, or mixture, per gallon of paint; to which, of course, may be added any desired pigment or coloring matter for purpose of coloring, all of which components are thoroughly ground together. The proportion of the base, per gallon of paint, may be varied to suit different paint requirements.

I claim:

1. A product for use in making bases for paints, comprising leather dried by heat treatment at a temperature below that which would carbonize the leather.

2. A base for paints, comprising ground scrap leather dried by heat treatment at a temperature below that which would carbonize the leather.

3. A base for paints, formed of scrap leather reduced to a fineness sufficient to pass through a screen of approximately not less than 150 mesh, and dried by heat treatment at a temperature below that which would carbonize the leather.

4. A base for paints, comprising scrap leather reduced to a fineness sufficient to pass through a screen of not less than approximately 150 mesh, and dried by heat treatment at a temperature between 250°–300° Fahrenheit.

5. The hereindescribed method of making material for use as a base for paints, consisting in drying leather by heat treatment at a temperature below that which would carbonize the leather.

6. The hereindescribed method of making a base for paints, consisting in finely reducing scrap leather and drying the ground leather by heat treatment at a temperature below that which would carbonize the leather.

7. The hereindescribed method of making a base for paints consisting in grinding scrap leather to a fineness sufficient to pass through a screen of approximately not less than 150 mesh, then drying the ground leather by heat treatment at a temperature below that which would carbonize the leather.

8. The hereindescribed method of making a base for paints consisting in grinding scrap leather to a fineness sufficient to pass through a screen of approximately not less than 150 mesh, then drying the ground leather by heat treatment at a temperature between 250°–300° Fahrenheit.

9. A paint, including a base formed of leather dried by heat treatment at a temperature below that which would carbonize the leather.

10. A paint, including a base formed of ground scrap leather dried by heat treatment at a temperature below that which would carbonize the leather.

11. A paint, including a base formed of scrap leather reduced to a fineness sufficient to pass through a screen of approximately not less than 150 mesh, and dried by heat treatment at a temperature below that which would carbonize the leather.

12. A paint, including a base formed of scrap leather, reduced to a fineness sufficient to pass through a screen of not less than approximately 150 mesh, and dried by heat treatment at a temperature between 250°–300° Fahrenheit.

In testimony that I claim the foregoing as my own, I affix my signature.

STANLEY J. BEEBE.